(12) United States Patent
Castellani

(10) Patent No.: US 7,320,274 B2
(45) Date of Patent: Jan. 22, 2008

(54) DELIVERY HEAD FOR ESPRESSO COFFEE MACHINES

(75) Inventor: Andrea Castellani, Milan (IT)

(73) Assignee: SAECO International Group S.p.A., Gaggio Montano, Bologna (IT)

( * ) Notice: Subject to any disclaimer, the term of this patent is extended or adjusted under 35 U.S.C. 154(b) by 0 days.

(21) Appl. No.: 11/076,736

(22) Filed: Mar. 10, 2005

(65) Prior Publication Data

US 2006/0123998 A1 Jun. 15, 2006

(30) Foreign Application Priority Data

Dec. 9, 2004 (IT) .......................... MI2004A2350

(51) Int. Cl.
*A47J 31/40* (2006.01)
*A47J 31/06* (2006.01)

(52) U.S. Cl. ..................... 99/295; 99/289 R; 99/302 R

(58) Field of Classification Search .......... 99/280–286, 99/287–303, 295, 306, 307, 316, 317; 426/77–79, 426/82, 84, 112, 433

See application file for complete search history.

(56) References Cited

U.S. PATENT DOCUMENTS

| 5,327,815 | A | * | 7/1994 | Fond et al. | .................. 99/295 |
| 5,343,799 | A | * | 9/1994 | Fond | ........................... 99/295 |
| 5,398,595 | A | * | 3/1995 | Fond et al. | .................. 99/295 |
| 5,398,596 | A | * | 3/1995 | Fond | ........................... 99/295 |
| 5,402,707 | A | * | 4/1995 | Fond et al. | .................. 99/295 |
| 5,472,719 | A | * | 12/1995 | Favre | ......................... 426/77 |
| 5,656,316 | A | * | 8/1997 | Fond et al. | ................ 426/433 |
| 5,897,899 | A | * | 4/1999 | Fond | ........................ 426/112 |
| 6,510,783 | B1 | * | 1/2003 | Basile et al. | ............. 99/289 R |
| 6,582,743 | B2 | * | 6/2003 | Cai | ........................... 426/510 |
| 2003/0056655 | A1 | * | 3/2003 | Kollep et al. | ................ 99/295 |

* cited by examiner

*Primary Examiner*—Timothy F. Simone
(74) *Attorney, Agent, or Firm*—Hedman & Costigan P.C.; James V. Costigan

(57) ABSTRACT

A delivery head for espresso coffee machines comprises a top supporting element pivoted to a bottom supporting element in turn made rigid with the machine body, said bottom supporting element comprising an infusion recess provided for receiving a coffee holding capsule, said delivery head further comprising an operating lever operating at least one of the support elements to define at least an open position for loading and unloading the coffee capsule, and a coffee delivery closed position, said head including perforating means for progressively perforating the capsule and capsule ejecting means.

6 Claims, 11 Drawing Sheets

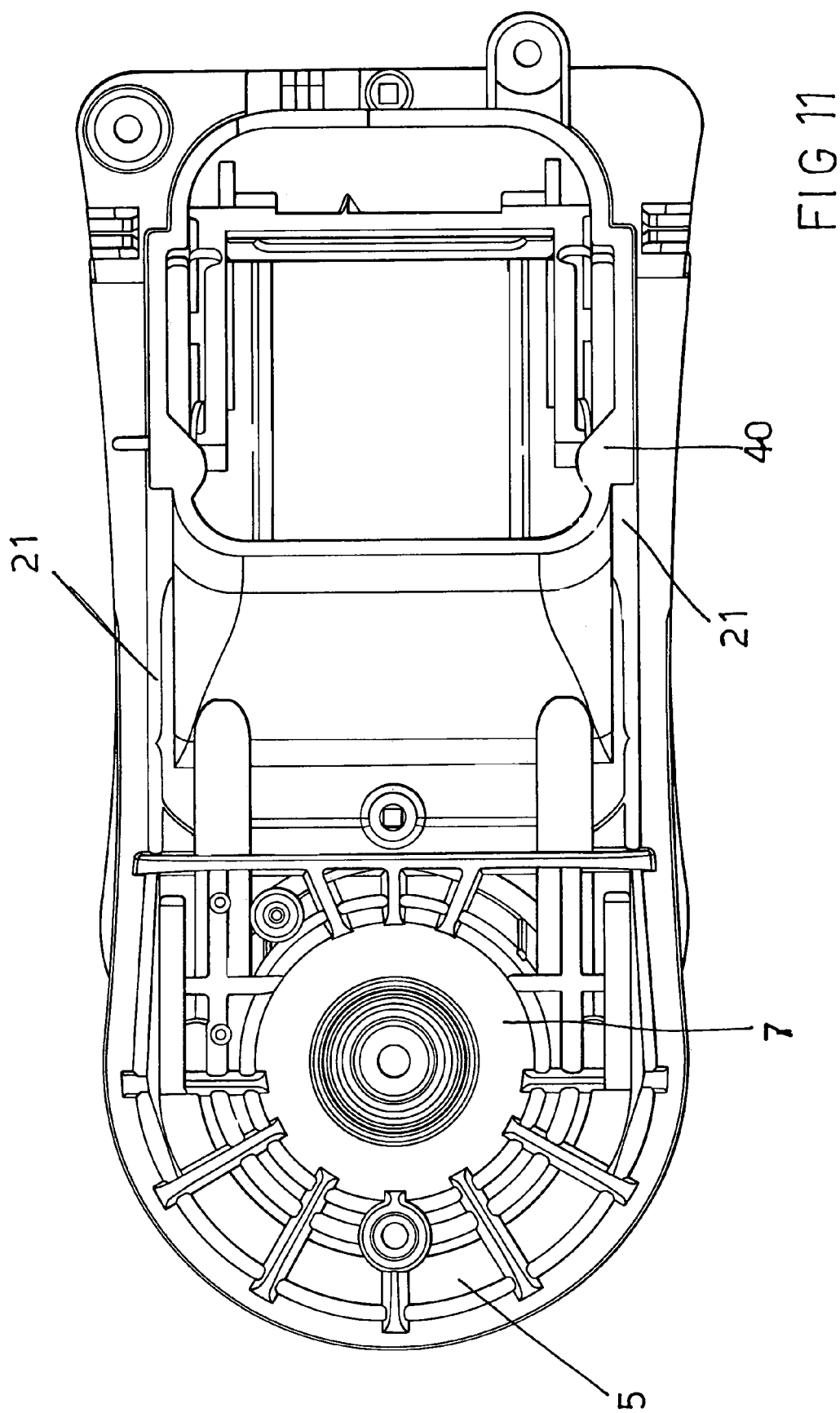

DELIVERY HEAD FOR ESPRESSO COFFEE MACHINES

BACKGROUND OF THE INVENTION

The present invention relates to an espresso coffee machine delivery head.

As is known conventional espresso coffee machines usually comprise an infusion unit, designed for receiving a disposable or single use capsule filter including a cylindric body holding at least a ground coffee portion.

More specifically, the infusion unit is supplied with pressurized hot water, produced by hot water producing members housed in the machine body.

In general, said infusion unit comprises a horizontal plate, on which is formed a guide allowing the capsule to slide from a loading position to an unloading position, by passing through an infusion middle position.

To accurately arrange the capsule at the infusion position, are conventionally used locating means, comprising two jaws arranged on the side of the guide and rotatively driven according to vertical axes, as counterbiassed by respective spring elements.

The above mentioned mechanisms, used in prior espresso coffee machines, are affected by a lot of drawbacks due to pressurized water steam and coffee powder.

In particular, among the above mentioned drawbacks, it is to be mentioned the jammings to which the infusion units of the coffee machines are subjected, and, more specifically, a not perfect sealing between the coffee capsule and its housing recess, during the infusion operation.

Another drawback of prior infusion units is that the loading of the coffee capsule is rather difficult to be performed and, sometimes, fails.

SUMMARY OF THE INVENTION

Accordingly, the aim of the present invention is to provide a delivery head, particularly for espresso coffee machines, which is so designed as to fully overcome the drawbacks of the prior art.

Within the scope of the above mentioned aim, a main object of the invention is to provide such a delivery head, in which the single-use or disposable capsule loading and unloading operations can be performed in a very easy and safe manner, from a user standpoint.

Yet another object of the present invention is to provide such a delivery head assuring a perfect infusion of the coffee beverage.

According to one aspect of the present invention, the above mentioned aim and objects, as well as yet other objects, which will become more apparent hereinafter, are achieved by a delivery head for espresso coffee machines, characterized in that said delivery head comprises a top supporting element pivoted to a bottom supporting element, said bottom supporting element being made rigid with a body of said machine; said bottom supporting element comprising an infusion recess, designed for receiving a coffee holding capsule; said delivery head further comprises an operating lever which operates at least one of said support elements to define at least an open capsule loading and unloading position, and a coffee delivery closed position, said head further including perforating means for progressively perforating said capsule and capsule ejecting means.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where:

FIG. 8 shows a rest position of the ejecting fork element;

FIG. 9 shows an initial opening position of the top supporting element, the ejecting fork element being held in its rest position;

FIG. 10 shows a maximum opening position of the top supporting element before disengaging the fork element upward driving means in which, at the end of the coffee capsule unloading operation, the top supporting element starts to disengage from the fork element which will return to its rest position by gravity;

FIG. 11 shows a bottom view of the elements illustrated in FIGS. 8, 9 and 10 and, more specifically, clearly show the two linear cams disengaging the fork element of the top supporting element during an opening step.

DESCRIPTION OF THE PREFERRED EMBODIMENTS

Figure 1:
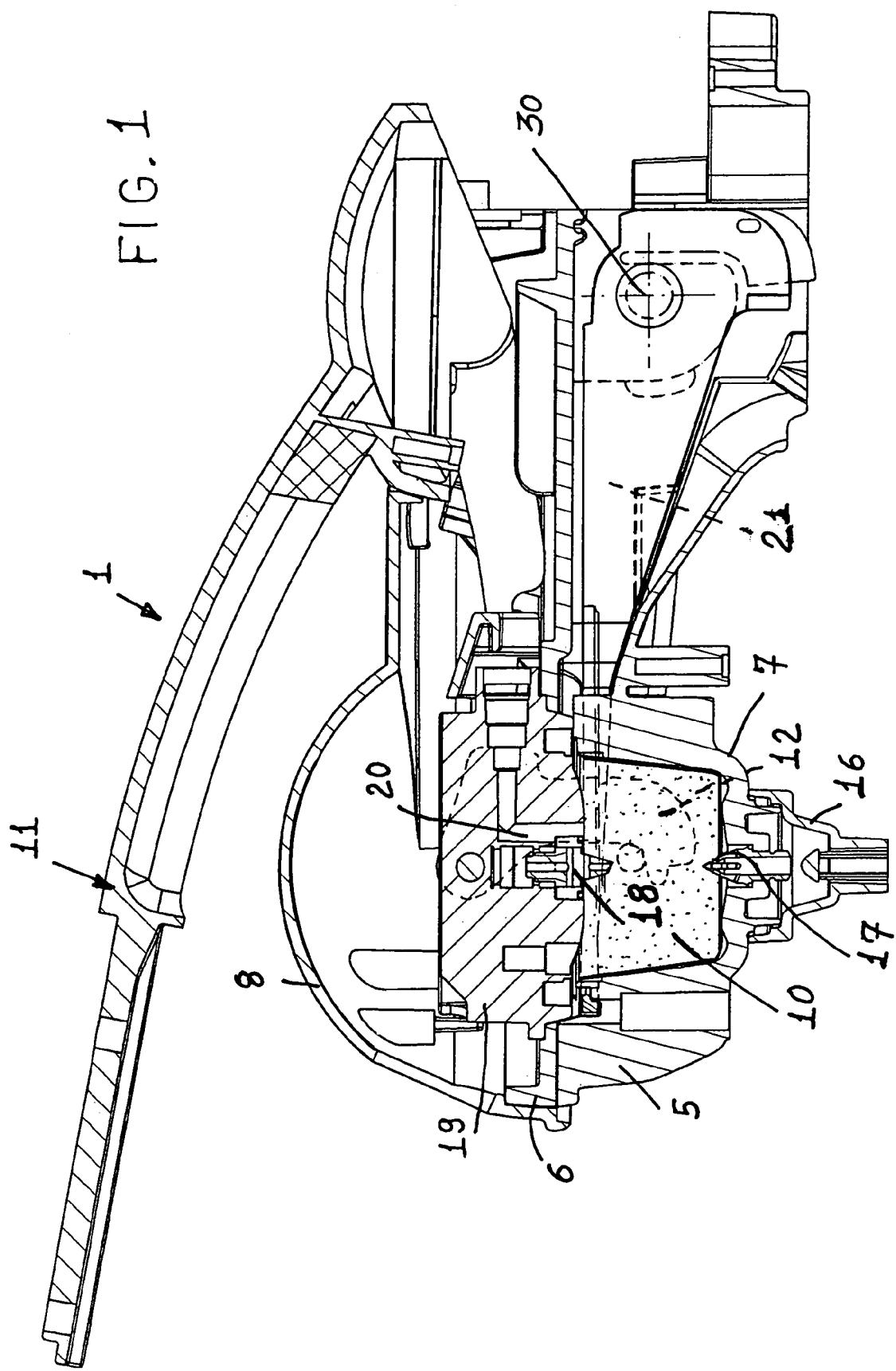
FIG. 1 is a side elevation view, as longitudinally cross-sectioned, of the delivery head according to the invention, being shown in a delivery position thereof.

With reference to the number references of the above mentioned figures, the delivery head according to the present invention, which has been generally indicated by the reference number 1, can be applied to an espresso coffee machine, generally indicated by the reference number 2, including a base or bottom 3 and an upright 4.

Said upright comprises, in the inside thereof, driving devices designed for driving said espresso coffee machine, said driving devices including, in a per se known manner, a pressurized hot water source, supplying the delivery head.

According to the present invention, the delivery head 1 comprises a top supporting element 6, pivoted, through a pivot pin 30, to bottom supporting elements 5, in turn made rigid with the upright 4 of the coffee machine.

As shown, the top supporting element 6 comprises a top cover 8, and the bottom supporting element 5 likewise comprises a bottom cover 7.

The bottom supporting element 5 comprises moreover a recess 9 provided for housing, during the coffee delivery, and as it will become more apparent hereinafter, a ground coffee holding capsule 10.

An operating or driving lever 11 is pivoted, through a pivot pin 31, to the top supporting element 6 for driving it, so as to define at least two operating positions: a first position closed on the bottom supporting element for delivery coffee, and a second open position for loading and ejecting the coffee capsule 10.

Figure 2:
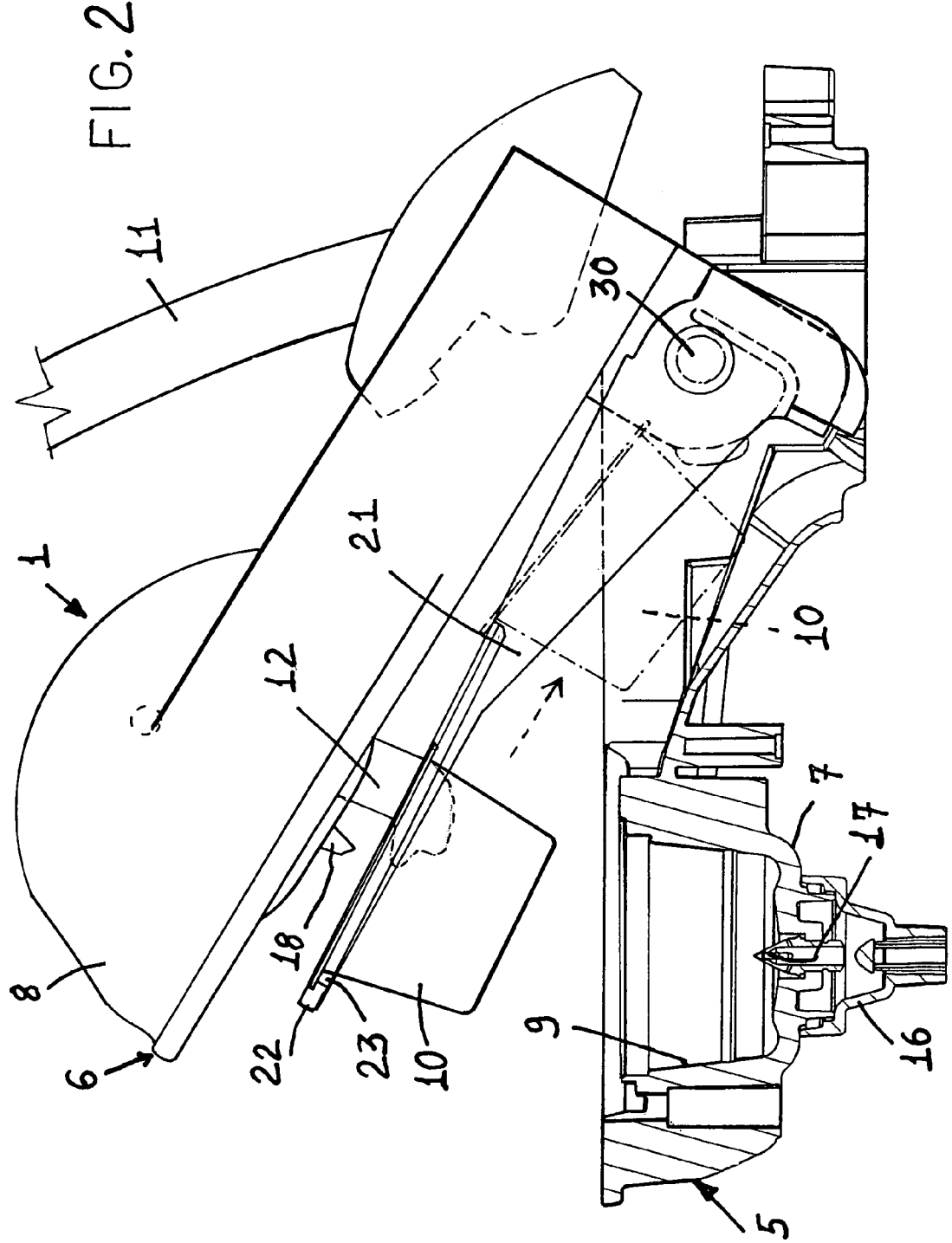
FIG. 2 is a further side elevation view, as partially longitudinally cross-sectioned, of that same delivery head, shown in a capsule ejecting position thereof.
Figure 3:
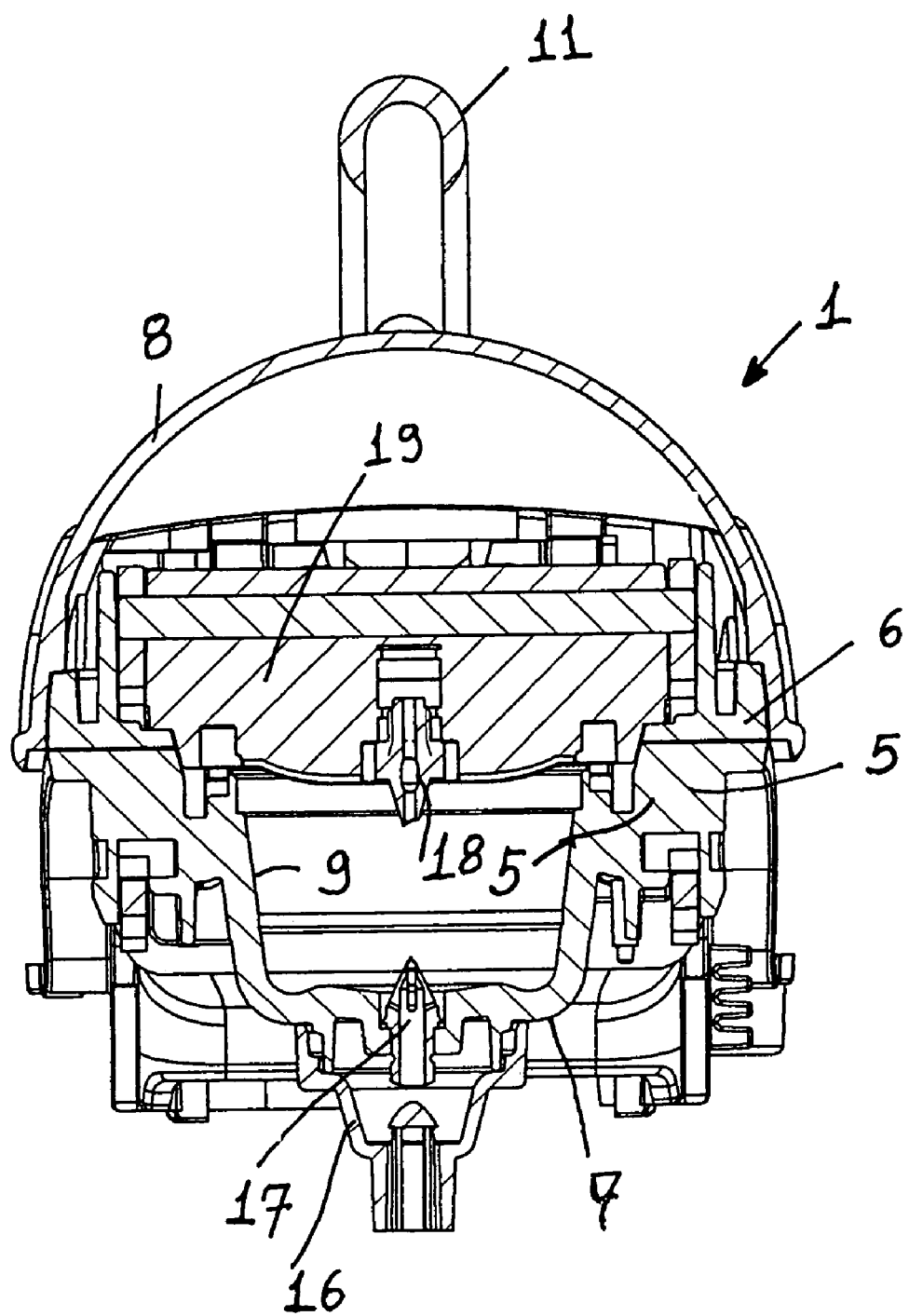
FIG. 3 is a cross-sectional front elevation view of the delivery head, shown in a delivery position thereof.
Figure 4:
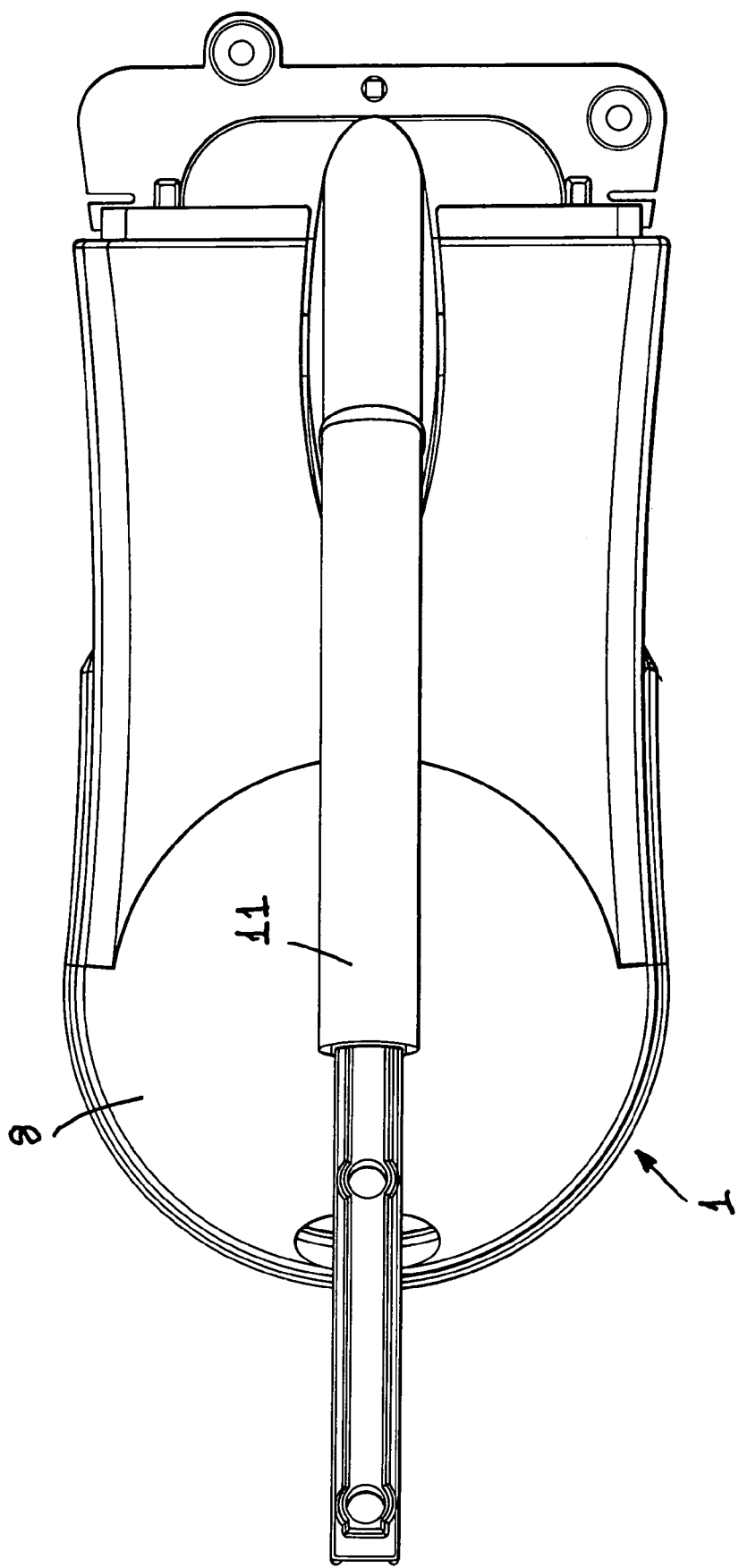
FIG. 4 is a top plan view of that same delivery head.
Figure 5:
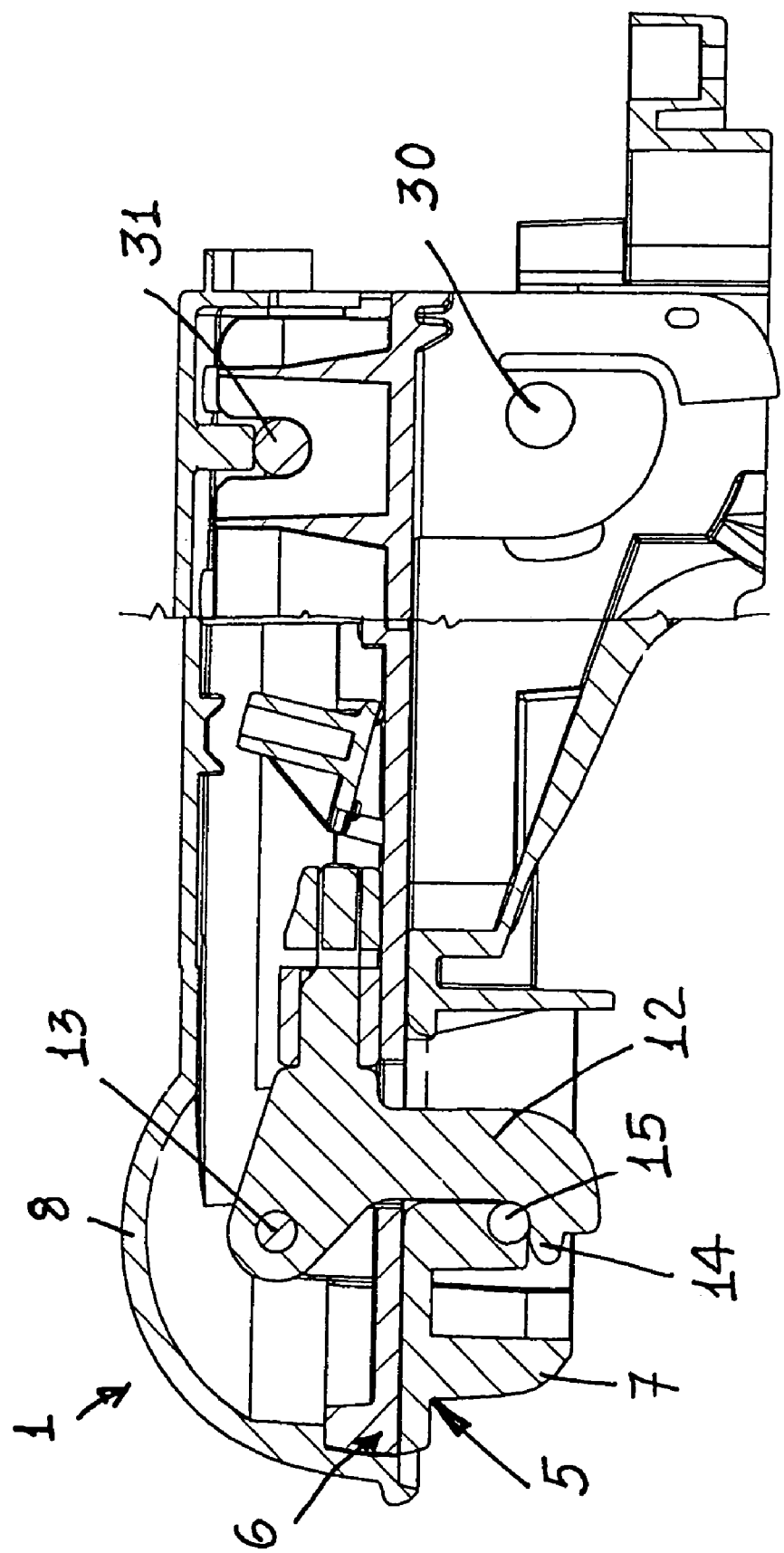
FIG. 5 is a partial side elevation view showing the delivery head, as longitudinal cross-sectioned according to a section plane different from that of FIG. 1 and shown in a broken away condition.
Figure 6:
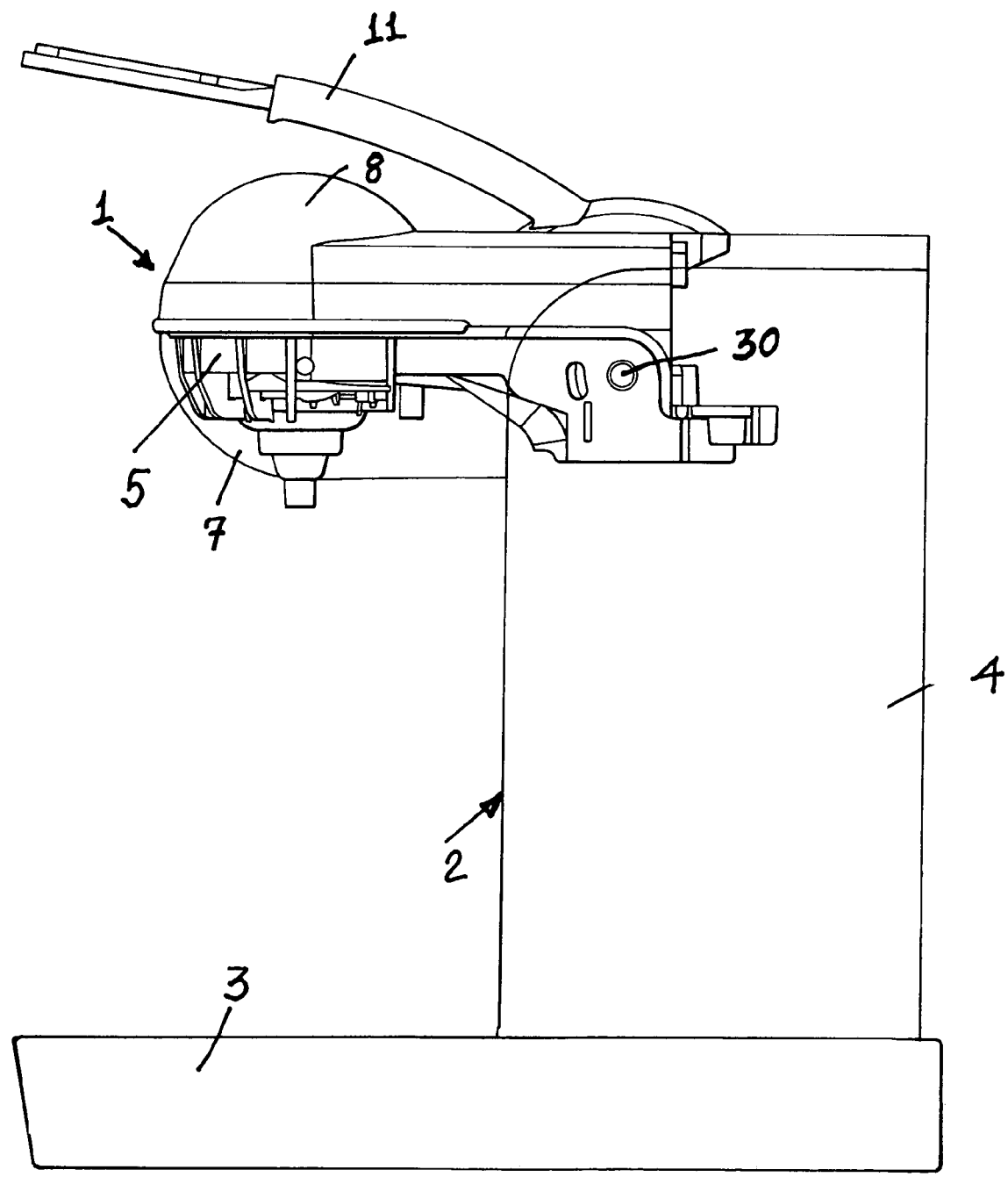
FIG. 6 is a partially broken away side elevation view illustrating a coffee machine including the delivery head according to the present invention, being shown in a delivery position thereof.
Figure 7:
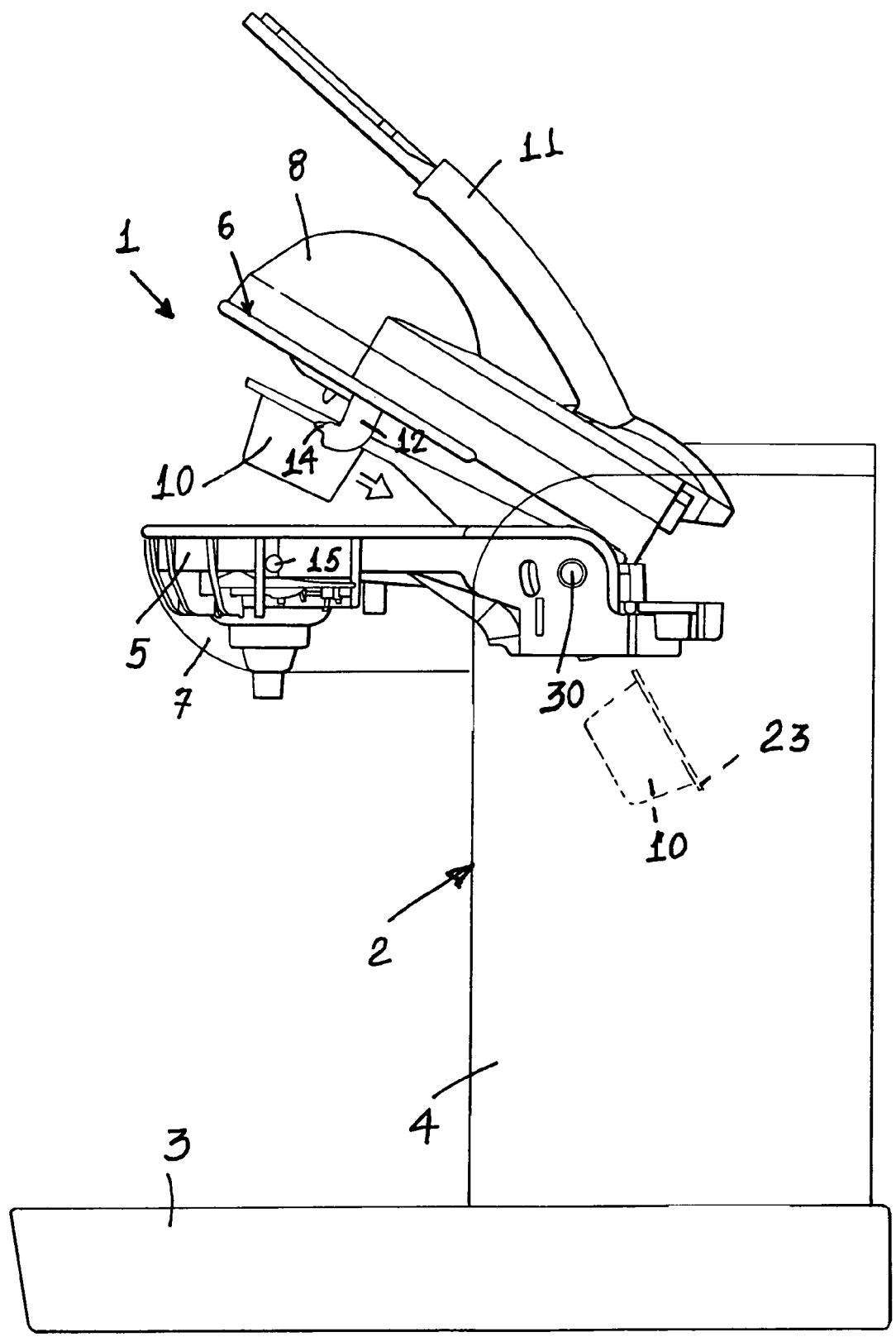
FIG. 7 is a view similar to FIG. 6, but illustrating the coffee machine during a capsule ejecting operating step.
Figure 8:
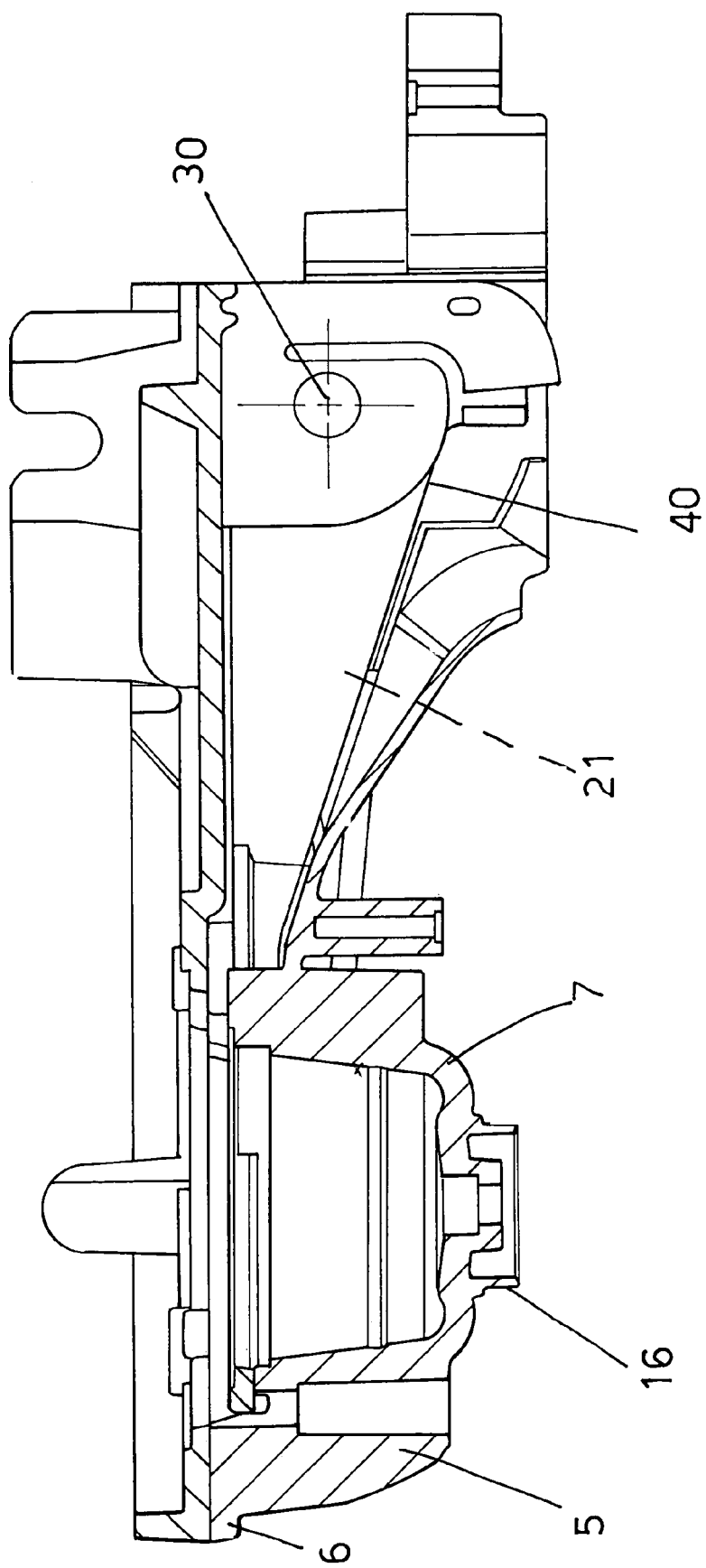
FIGS. 8, 9 and 10 show three side cross sections of the bottom supporting element, the top supporting element and the ejecting fork element and, more specifically.
Figure 9:
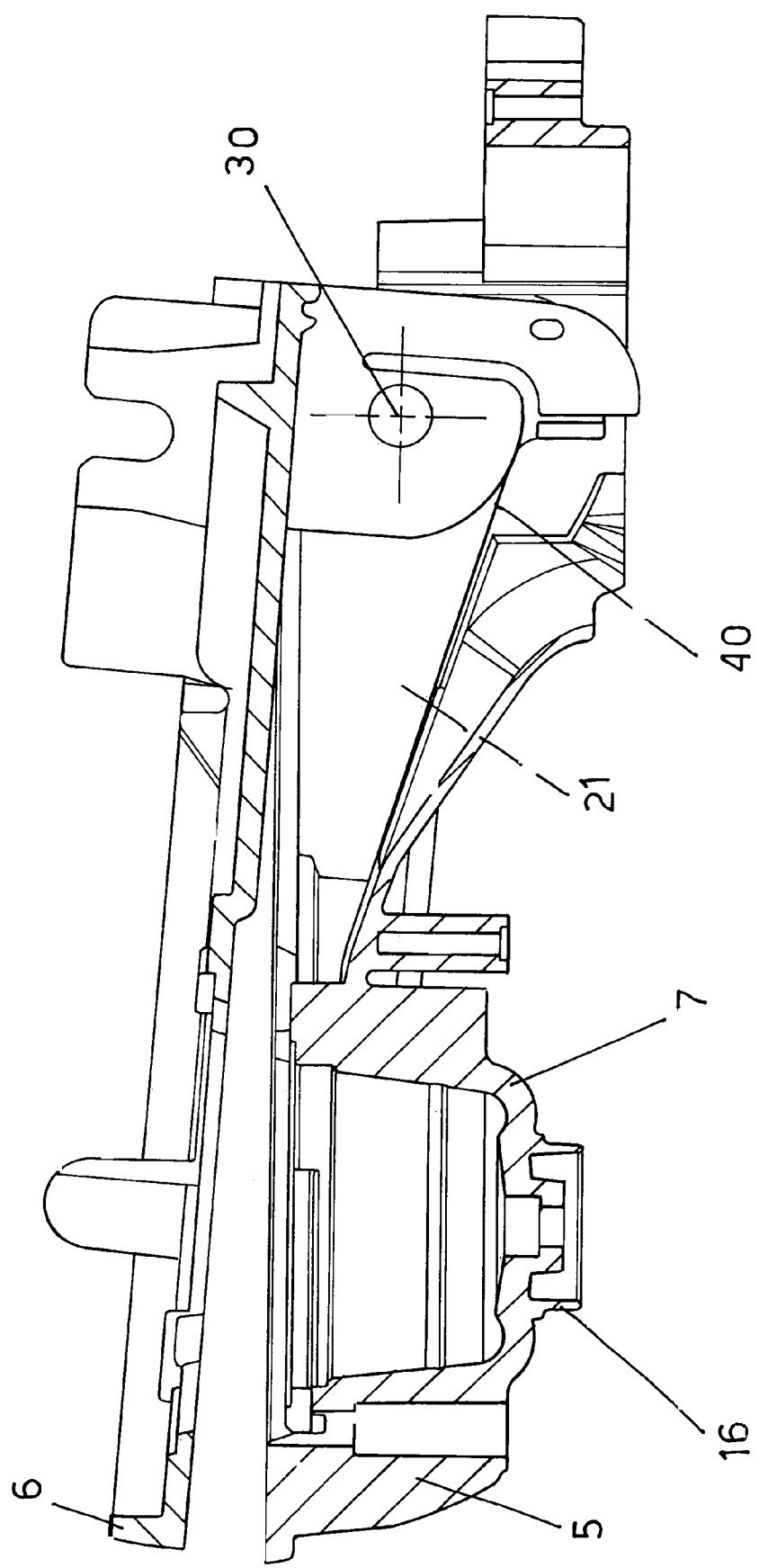
Figure 10:
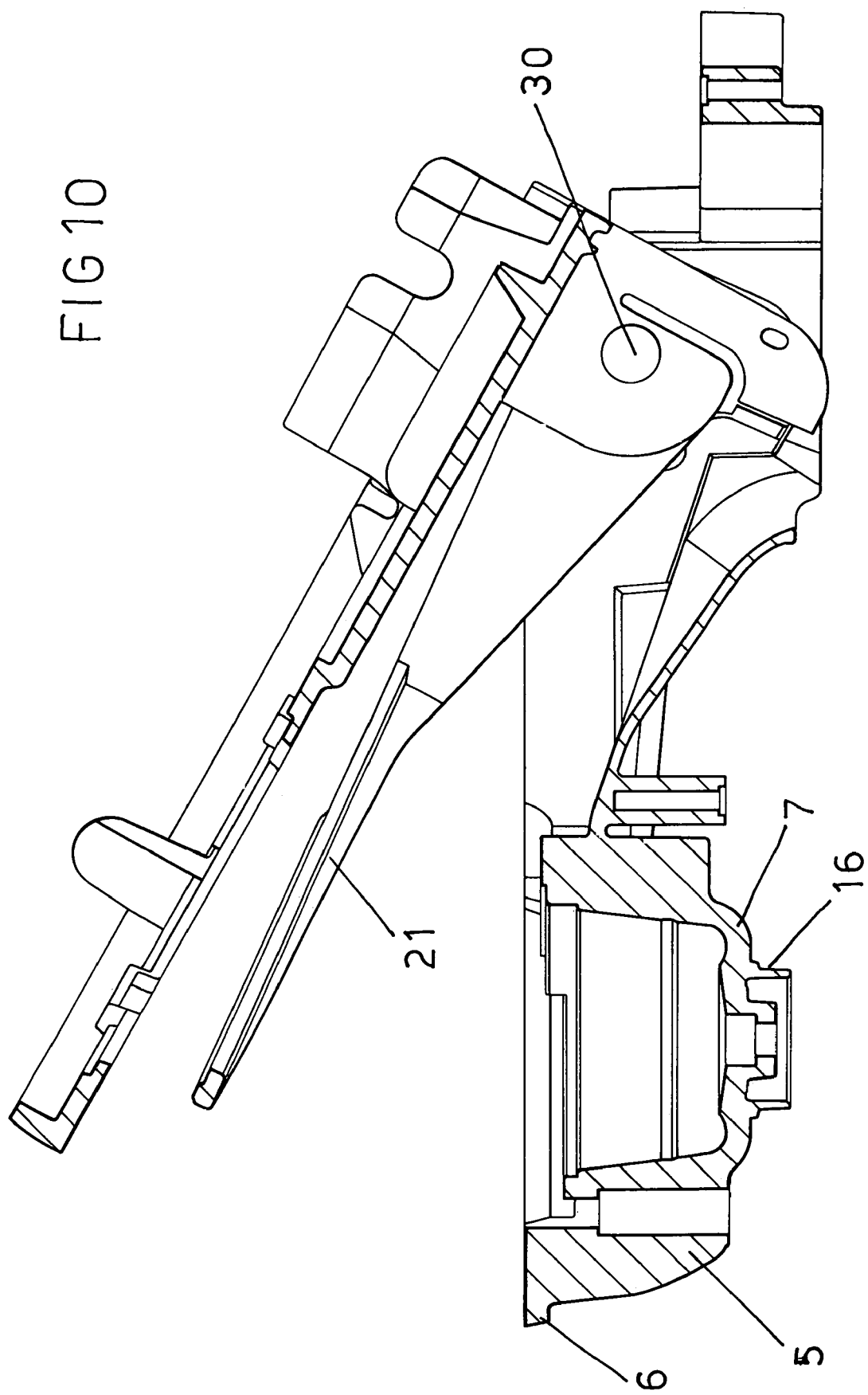

The closed delivery position can be clearly seen in FIGS. 1, 3, 5 and 6, whereas the capsule loading and ejecting open position can be clearly seen in FIGS. 2 and 7.

More specifically, the delivery closed position is stably held so as to resist against the delivery pressure, by locking means including a locking lever 12 pivoted to the top supporting element 6 at a locking lever pin 13 and having a hook shaped portion 14, affecting a locking peg 15, rigid with said bottom supporting element 5.

According to the present invention, the delivery head 1 comprises delivery means, including perforating means for progressively perforating the coffee capsule 10.

In particular, said delivery means comprise a delivery nozzle 16, formed in the bottom supporting element 5, at an outlet hole formed in the bottom of the coffee capsule 10 housing recess 9.

In this position, according to the invention, is arranged a bottom perforating assembly 17, preferably of circular cross-section tapering configuration, adapted to perforate the bottom of the coffee capsule 10.

Such a perforation is obtained as the coffee capsule 10 is pressed against the bottom perforating assembly 17, under the pressure provided by an overheated water flow, introduced into said coffee capsule 10, and providing a downward directed pushing of the bottom wall of said coffee capsule 10 against the bottom perforating assembling or element 17.

The perforating means comprise moreover a top perforating assembly or element 18, having a quadrangular tapering cross-section, and being coupled to a support 19 for the top perforating element 18, in turn coupled to the top supporting element 6.

The support 19 for the top perforating element 18 comprises at least a delivery duct 20, adjoining the top perforating element 18, designed for delivery pressurized water coming from the pressurized water generating members of the coffee machine.

More specifically, the top perforating element or assembly 18 affects the top surface of the coffee capsule 10 to perforate it, as the head is closed, to allow pressurized water supplied by the delivery duct 20 to enter the capsule 10.

Said capsule 10 comprises an outer film element, which can be perforated by the top 18 and bottom 17 perforating elements or assemblies, and being provided with an inner rigid filtering construction holding the ground coffee powder.

At the top thereof, the filtering rigid construction of the coffee capsule or cartridge 10 comprises a plurality of channels allowing top water entering the hole formed by the top perforating element 18 to be distributed at the top.

Further, according to the present invention, the delivery head 1 comprises moreover coffee capsule 10 ejecting means, including a capsule ejecting fork element 21 pivoted to the pivot pin 30 applied to the bottom supporting element 5 and including an annular portion 22 designed for encompassing the top of the coffee capsule 10, which is suitably provided with a perimetrical bearing edge portion 23.

The delivery head 1 according to the present invention operates as follows.

At the start, the delivery head 10 is arranged in an open position, shown for example in FIG. 2, in a ready condition for receiving a coffee capsule or cartridge 10, which is partially engaged in the capsule recess 9, to locate the powder capsule near the bottom perforating assembly or element 17, without causing said perforating element 17 to perforate, at the start, the bottom surface of the coffee cartridge or capsule 10.

Then, the head 1 is closed by actuating the lever 11 under a downward pressure, to cause the top supporting element 6 to be closed on the bottom supporting element 5.

As the top supporting element 6 is closed on the bottom supporting element 5, said top supporting element 18 will perforate the top surface of the coffee capsule or cartridge 10.

Then pressurized water is delivered which, through the delivery duct 20 and the hole formed by the top perforating element 18 can enter the coffee capsule and diffuse therethrough owing to the provision of suitable channels formed inside said capsule 10.

Thus, the overheated water pressure will cause a further perforation of the bottom surface of the capsule by the bottom perforating element 17, thereby said bottom surface is pressed downward against the bottom perforating element 17 in a subsequent operating step, with respect to the perforation of the top surface of the coffee capsule 10.

In particular, water passes through the capsule 10 and exits the delivery nozzle 16 thereby providing the coffee beverage, which is collected in a cup or the like, not specifically shown.

At the end of the delivery operation, the top supporting element 6 is raised by operating the lever 11 pivoted to the pivot pin 31.

In particular, as the top supporting element 6 is raised, also the fork element 21 is raised owing to the provision of tooth elements formed on the fork element 21 and cooperating with respective slanted planes or surfaces of said top supporting element 6, which operate as linear cams 40.

Thus, the fork element 21 will upwardly drive said capsule 10, by its annular portion 22, which engages at the bottom thereof the bearing perimetrical edge portion 23 of the capsule 10.

Upon achieving a set inclination, as is clearly shown in FIG. 2, the capsule 10 will slide on the fork element 21 and, after having passed the annular portion 22, will fall inside the fork element 21 and, through a specifically designed passage, will be collected in a collecting vessel formed in the upright 2.

Then, as the mentioned inclination is exceeded, the tooth element of the fork 21 will be disengaged from the slanted surfaces of the top supporting element 6.

Accordingly, the fork element 21 can return to its starting position in which it will abut against the bottom.

The annular portion 22 thereof, in particular, will be arranged at the top edge portion of the capsule 10 recess 9.

Thus, the coffee machine will be ready for delivery a new coffee cup.

It has been found that the invention fully achieves the intended aim and objects.

In fact, the invention provides a delivery head for espresso coffee machines which is adapted to provide a perfect infusion of the coffee beverage, and, moreover, being of very easy and safe operation.

In practicing the invention, the used materials, and the contingent size and shapes can be any, according to requirements and the status of the art.

The invention claimed is:

1. A delivery head for an espresso coffee machine for preparing a coffee infusion from a disposable coffee capsule having a capsule top surface and a capsule bottom surface, said delivery head comprising a top supporting element pivoted to a bottom supporting element, said top supporting element supporting a top perforating element having a quadrangular pyramidal cross-section, said bottom supporting element being made rigid with a body of said machine, said bottom supporting element comprising a coffee capsule infusion recess for housing said coffee capsule, said recess having a recess bottom, said delivery head further comprising an operating lever which can be manually raised and lowered to define a coffee capsule loading and a coffee capsule ejecting position, respectively, said top supporting element comprising a top cover and said bottom supporting element comprising a bottom cover, wherein said operating lever is a single arm operating lever pivoted at an operating lever single pivot pin only to said top supporting element, wherein said delivery head further comprises locking means to firmly hold said coffee capsule in a coffee infusion delivery position, said locking means comprising a locking lever pivoted to said top supporting element at a locking lever pivot pin and having a hook portion operating on a locking peg rigid with said bottom supporting element, wherein said delivery head comprises coffee infusion delivery means including a coffee infusion delivery nozzle coupled at a bottom thereof to said bottom supporting element, at an outlet hole formed through said bottom of said coffee capsule infusion recess, wherein from said bottom of said coffee capsule infusion recess projects a bottom perforating element having a circular tapering cross section, said bottom perforating element cooperating with said top perforating element to progressively perforate at first said top surface and then said bottom surface of said coffee capsule, said bottom surface of said coffee capsule being perforated as said coffee capsule is pressed against said bottom perforating element by an overheated water pressure flow, generated upon lowering said operating lever, after that said top perforating element has perforated said top surface of said coffee capsule, and wherein said delivery head also comprises coffee capsule ejecting means for automatically ejecting said coffee capsule as said operating lever is raised.

2. A delivery head, according to claim 1, wherein said top supporting element comprises at least an adjoining delivery duct for delivering pressurized water coming from pressurized water generating elements of said coffee machine.

3. A delivery head, according to claim 1, wherein said capsule comprises an outer film to be perforated by said top and bottom perforating elements, and an inner ground coffee holding filtering rigid construction, said rigid filtering construction comprising, at a top thereof, a plurality of channels for allowing hot water to enter a hole formed by said top perforating element.

4. A delivery head, according to claim 1, wherein said coffee capsule ejecting means comprise an ejecting fork element pivoted to a pivot pin applied to said bottom supporting element and including an annular portion encompassing a top of said capsule.

5. A delivery head, according to claim 4, wherein said fork element is automatically raised as said operating lever is raised, said fork element comprising a plurality of tooth elements cooperating with respective linear cam slanted surfaces of said top supporting element.

6. A delivery head, according to claim 1, wherein said coffee capsule comprises a perimetrical bearing edge portion, thereby, as said operating lever is raised, said coffee capsule is partially engaged in said coffee capsule infusion recess, and abuts against said bottom perforating element.

* * * * *